(12) United States Patent
Cichowlas

(10) Patent No.: US 7,197,764 B2
(45) Date of Patent: Mar. 27, 2007

(54) SYSTEM FOR AND METHODS OF ADMINISTRATION OF ACCESS CONTROL TO NUMEROUS RESOURCES AND OBJECTS

(75) Inventor: Bruce Cichowlas, Framingham, MA (US)

(73) Assignee: Bea Systems Inc., San Jose, CA (US)

( * ) Notice: Subject to any disclaimer, the term of this patent is extended or adjusted under 35 U.S.C. 154(b) by 0 days.

(21) Appl. No.: 10/186,570

(22) Filed: Jul. 1, 2002

(65) Prior Publication Data

US 2003/0093672 A1 May 15, 2003

Related U.S. Application Data

(60) Provisional application No. 60/302,181, filed on Jun. 29, 2001.

(51) Int. Cl.
*G06F 12/14* (2006.01)
*G06F 17/30* (2006.01)
*G06F 15/16* (2006.01)

(52) U.S. Cl. .................. 726/6; 726/1; 726/2; 726/10; 713/182; 709/223; 709/225; 709/229; 705/54; 707/1

(58) Field of Classification Search ........... 709/229, 709/225, 223; 713/201, 182; 705/54; 707/103 R, 707/9, 1; 726/1, 2, 6, 10
See application file for complete search history.

(56) References Cited

U.S. PATENT DOCUMENTS 5,911,143 A * 6/1999 Deinhart et al. ...... 707/103 R
5,944,824 A * 8/1999 He ............................. 713/201
6,014,666 A * 1/2000 Helland et al. ............... 707/9
6,154,741 A * 11/2000 Feldman ...................... 707/9
6,158,010 A * 12/2000 Moriconi et al. ............ 726/1
6,161,139 A * 12/2000 Win et al. .................. 709/225
6,453,353 B1 * 9/2002 Win et al. .................. 709/229
6,516,315 B1 * 2/2003 Gupta .......................... 707/9
6,539,426 B1 * 3/2003 Meek et al. ................ 709/223
6,725,456 B1 * 4/2004 Bruno et al. ............... 718/102
2002/0178119 A1 * 11/2002 Griffin et al. ................ 705/54

OTHER PUBLICATIONS

J. Richardson et al., CACL: Efficient Fine-Grained Protection for Objects, ACM SIGPLAN Notices, vol. 27, Iss. 10, Oct. 1992, pp. 263-275.*
U.S. Appl. No. 09/978,635, filed Jun. 30, 2000, Daniel Feldman.
U.S. Appl. No. 10/078,914, filed Feb. 20, 2002, Graylin et al.
U.S. Appl. No. 10/107,570, filed Mar. 27, 2002, Leary et al.
U.S. Appl. No. 10/107,949, filed Mar. 27, 2002, Fred Moses.

* cited by examiner

*Primary Examiner*—Taghi T. Arani
(74) *Attorney, Agent, or Firm*—Sam Pasternack; Choate Hall & Stewart LLP

(57) ABSTRACT

Described are systems and methods used for the administration of access control to numerous resources and objects. An administrator may control access to resources and objects in accordance with defined rules using an "object-centric" view. A template may be used for creating and managing access policies to large numbers of resources. The template may use parameters to define instances of a template. Parameters may be used to define variations of the template. Access privileges of a resources may be inherited in accordance with a hierarchy.

23 Claims, 10 Drawing Sheets

SYSTEM FOR AND METHODS OF ADMINISTRATION OF ACCESS CONTROL TO NUMEROUS RESOURCES AND OBJECTS

This application claims priority to U.S. Provisional Application Ser. No. 60/302,181 filed Jun. 29, 2001, the contents of which are incorporated by reference in their entirety.

FIELD OF THE INVENTION

The present invention relates to the administration of computer system access control, and more specifically relates to controlling access to numerous computer resources and objects. Conventional access control systems and their associated methods of operation typically use a "user-centric" orientation. In contrast, the present invention adjudicates user requests from an "object-centric" orientation, specifically designed to address the need for access control to massively numerous computer resources and objects.

BACKGROUND OF THE INVENTION

Controlling access to an exponentially growing array of data by an increasing number of users represents one of the greatest challenges facing the future of the Internet. Access control and privilege management, no matter the form, presents a cumbersome issue for all types of businesses employing the Internet. Typically, administration tools for access control focus only on the identity of accessors and associated policies, without allowing for massively scalable or sufficiently granular levels of information management. Further, access control administration tools generally require that the user have a high level of expertise.

For instance, it might be necessary in the future to deal with millions of objects, manipulating carefully chosen subgroups of typically less than fifty objects in parallel. The usability of the methods that select these subgroups and manipulate them in parallel may be critical to the viability of the overall project and processes.

The amount of data and resources in the next-generation Internet is expected to increase massively, and the complexity of managing those resources will likewise increase. What is needed is a way to manage the complexity of a large number of resources.

Requests for system resources via the Internet must include contextual information, such as the identity of the user and the resources being requested, for proper adjudication of access control. System resources can be organized using "attributes and values." Name spaces for the resources can often be created using "attributes and values", and each resource name space ("resource key") is associated with specific or general access rules ("entitlement expression" or "eexpression"). Together, they form a policy. As used from this point forward, the term "resources" refers to the resource key rather than the actual resource that might be a piece of data contained in a database, a function in an application, or a hardware resource, such as opening a lock on a door.

Associating the "attributes and values" referred to above with requested resources represents a considerable system management issue. Resources can be organized as groups that are generated, used and manipulated together, which are called "templates." The templates are used to manage resource keys and their associated entitlement expressions. A health record, for example, may be separated into several distinct resources to be protected by different policies (e.g., healthrecord.patientxyz.contactinfo may have a very different access privilege/eexpression than healthrecord.patientxyz.HIVtestresult). A template can group these resources, and instantiate policies (resource keys and eexpressions) for all the patient's health record, and manage "health records" at a meta level, rather than dealing with each individual's specific record and specific resources in that record, yet allowing exceptions and unique access privileges for specific resources in specific patient's health records.

"Attributes and values" and templates are independent. Each may be useful in operation both separately and in combination. It is somewhat analogous to sorting a hand of cards: one could sort by suit or by value. If one sorts by suit, one could still sort by value within the suit. In a similar way, over a much larger universe of objects, it is useful to be able to select and manipulate based on attributes and values, and it is also useful to be able to select and manipulate based on templates. It can be useful to use both, particularly when the number of objects is high and the relationships are complex. What is needed is a way to associate and embed attributes and values with resources.

Most people using the Internet are not computer programmers. The problems unsophisticated computers users encounter are exacerbated when the number of objects is large. Access control alone requires complex programs to adjudicate users' attempts to log onto a computer or network. As the number of objects stored on a system increases, the complexity of this adjudication also increases. What is needed is a way to manage the complexity of access control to a large number of objects.

Creating, modifying and deleting groups of related resources can be very complex and inefficient. Systems can use templates to efficiently and reliably create and otherwise control groups of related resources. Additionally, systems can use attributes and groups for this purpose, with or without the use of templates. What is needed is a way to efficiently create, modify, and delete groups of related resources with similar access control needs in a single operation, such as using templates, with or without attributes and groups, or else using attribute and groups alone.

SUMMARY OF THE INVENTION

The present invention provides a system for and associated methods of administration of access control to numerous resources and objects. The present invention operates from an "object-centric" view, in contrast with that of the conventional "user-centric" system of access control administration. The system described optimally employs the "Entitlement engine" and its associated protocols for data storage (BMAP) described in a U.S. Pat. No. 6,154,741 to Daniel J. Feldman, entitled "Entitlement Management and Access Control System." However, the present invention may be used by any access management system and also incorporate a wide array of database administration protocols, such as Lightweight Directory Access Protocol (LDAP).

The present invention associates an administrative control tool with the management of an access control system. The administrative control tool may be utilized either by an administrator or by programmatic methods not directly requiring the input of an administrator. The administrative control tool may be capable of using a wide array of database storage systems for management of the associated access control rules.

A first advantage of the present invention is that it provides a way to manage the complexity of a large number of resources.

A second advantage of the present invention is that it provides a way to associate and embed attributes and values with resources.

A third advantage of the present invention is that it provides a way to ease the complexity of a system for users with less advanced computer skills than those of programmers.

A fourth advantage of the present invention is that it provides a way to manage the complexity of access control to a large number of objects.

A fifth advantage of the present invention is that it provides a way to efficiently create, modify and delete groups of related resources with similar access control needs in a single operation.

A sixth advantage of the present invention is that it provides a way to operate various components of the overall system independently of the operating system.

A seventh advantage of the present invention is that it provides a way to control access in a very narrow way in some parts of the system and more broadly in others, where this choice can be reconsidered at any time.

A first aspect of the present invention is a system for administration of access control to numerous resources and objects, including a client personal computer (PC); an application program; a network, such as the Internet or an intranet; an authorization mechanism (such as the Entitlement Engine, but not limited to this specifically); a store of rules about objects/users; an administrative tool and associated application program interfaces (APIs); a data store; a controller; and an administrator PC.

A second aspect of the present invention is a method of initial setup of the system utilizing an administrative tool, including the steps of creating attributes; assigning possible values to attributes; and creating object names.

A third aspect of the present invention is a method of using the system to order enumerated accessible resources, including the steps of querying an API for enumeration and showing the accessible documents.

A fourth aspect of the present invention is a method of using attributes and values to ease access control administration, including the steps of querying an administrative tool via a graphical user interface (GUI) form; presenting the results; and choosing attributes.

A fifth aspect of the present invention is a method of using attributes and values to segment administration, including the steps of selecting allowable attributes for a sub-administrator; and storing data in an object key database.

A sixth aspect of the present invention is a method of designing and creating templates in access control administration, including the steps of identifying a need for multiple resources related in a particular way via a GUI form; identifying parameterized ways that templates may vary; creating a template; determining whether the template is satisfactory; and editing the template.

A seventh aspect of the present invention is a method of using or instantiating templates in access control administration, including the steps of choosing a template to instantiate; supplying the required parameters; and calling on the template API.

An eighth aspect of the present invention is how the notion of attributes and values can be used separate or together with the notion of templates.

A ninth aspect of the present invention is a method of inheriting access rights through a hierarchy, to improve control and ease of operation.

BRIEF DESCRIPTION OF THE DRAWING

The invention is described with reference to the several figures of the drawing, in which.

DETAILED DESCRIPTION OF CERTAIN PREFERRED EMBODIMENTS

The present invention provides a system for and associated methods of administration of access control to numerous resources and objects. The present invention operates from an "object-centric" view, in contrast with that of the conventional "user-centric" system of access control administration. The system described optimally employs the "Entitlement engine" referred to and incorporated by reference above as an authorization mechanism, however, the present invention may be used by any access management system and also incorporate a wide array of database administration protocols, such as Lightweight Directory Access Protocol (LDAP).

In certain embodiments, the system includes a special parameter called {super} that is useful in establishing access privilege inheritances. Through the use of {super} and DefaultAccessPrivileges, it is shown that an administrator can control access to resources and objects with great specificity or detail in some parts of the system and more broadly in others.

Figure 1:
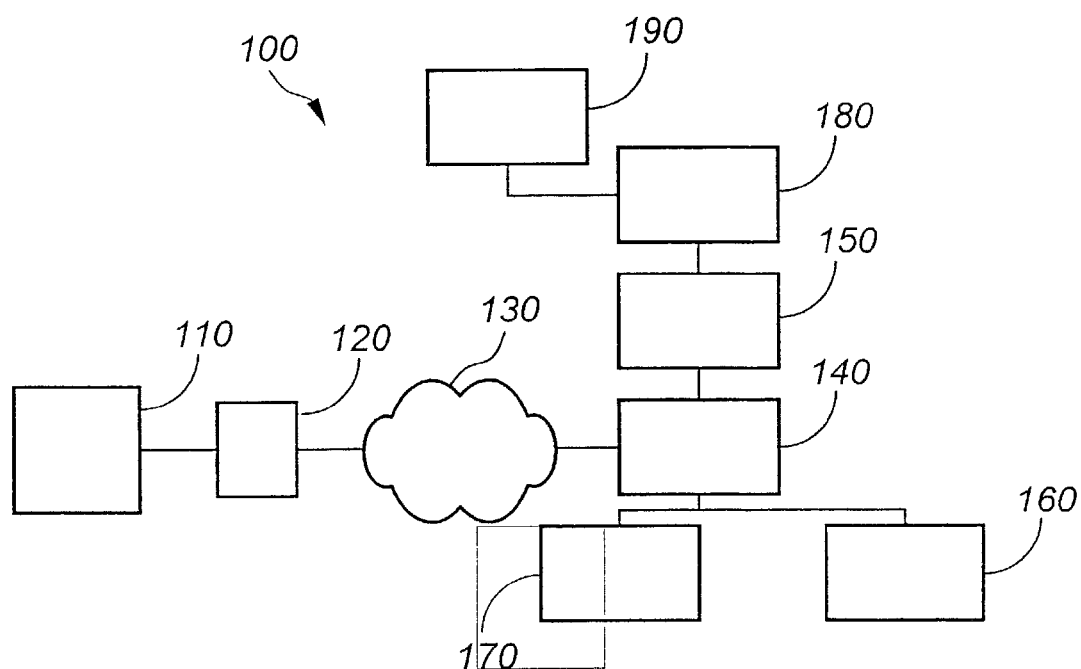
FIG. 1 is a block diagram showing a system for administration of access control to numerous resources and objects.

FIG. 1 illustrates a system 100 for administration of access control to numerous resources and objects. System 100 includes a client personal computer (PC) 110 capable of remotely executing an application program 120 that accesses an authorization mechanism 140 via a network 130, such as the Internet or an intranet. Authorization mechanism 140 connects via an internal network to a data table of rules about objects/users 150. Requests from client PC 110 that are accepted by authorization mechanism 140 draw on system resources such as a store of data 160 and a controller 170. An administrative tool 180 (along with its associated application program interfaces or APIs) has access to to the rules about objects/users 150. An administrator PC 190 connects to administrative tool 180 via an internal network, and also monitors and accesses administrative tool 180.

Alternatively, application program 120 may reside on client PC 110 for local execution. However, distributed systems like the present invention are typically characterized by client PC 110 connecting to application program 120 via network connection.

Also, with sufficient security precautions, it is possible to perform network administration remotely by inserting a network connection between 180 and 190.

In operation, client PC 110 requests some data 160 or operation by controller 170 using application program 120. This request may take the form of commands such as read, write, lock, and unlock, or may in some way manipulate data 160 and/or controller 170. Requests received via network 130 proceed to authorization mechanism 140, which in turn consults rules about objects/users 150 via network connection. Authorization mechanism 140 needs to know the precise identity of the user requesting access on client PC 110 and the exact description of the object being requested. Rules regarding objects/users 150 take the form of a data table employing BMAP or another database administration system used to store and adjudicate access control decisions. Administrative tool 180 creates and manipulates rules about objects/users 150. Administrator PC 190 represents the network-connected workstation used to manage administrative tool 180, but an administrator using administrator PC 190 need not monitor such management. Rules about objects/users 150 determines whether the client PC 110 request should be allowed (either "yes" or "no"), and returns this determination to authorization mechanism 140. If authorization is granted, authorization mechanism 140 accesses the associated information or actions from data 160 and controller 170 and returns the results to client PC 110 via network 130.

Typically, rules about objects/users 150 are organized in the manner described in the following co-pending U.S. patent applications, which are assigned to the assignee of the present invention and the contents of which are herein incorporated by reference: "System for Uniform Interface with an Encapsulated Entitlement System", application Ser. No. 10/107,570 filed Mar. 27, 2002; "Entitlement Management and Access Control System", application Ser. No. 09/978,635 filed Oct. 16, 2001; "System and Method for Storing and Elaborating User Preferences", application Ser. No. 10/078,914 filed Feb. 20, 2002; "System and Method for Managing Objects and Resources with Access Rights Embedded in Modes within a Hierarchical Tree-Structure", application Ser. No. 10/107,949 filed Mar. 27, 2002. These co-pending applications primarily relate to the creation, maintenance and access to accessor groups or lists, and object keys. The present invention relates primarily to the grouping of the object keys for better control and usability.

Figure 2:
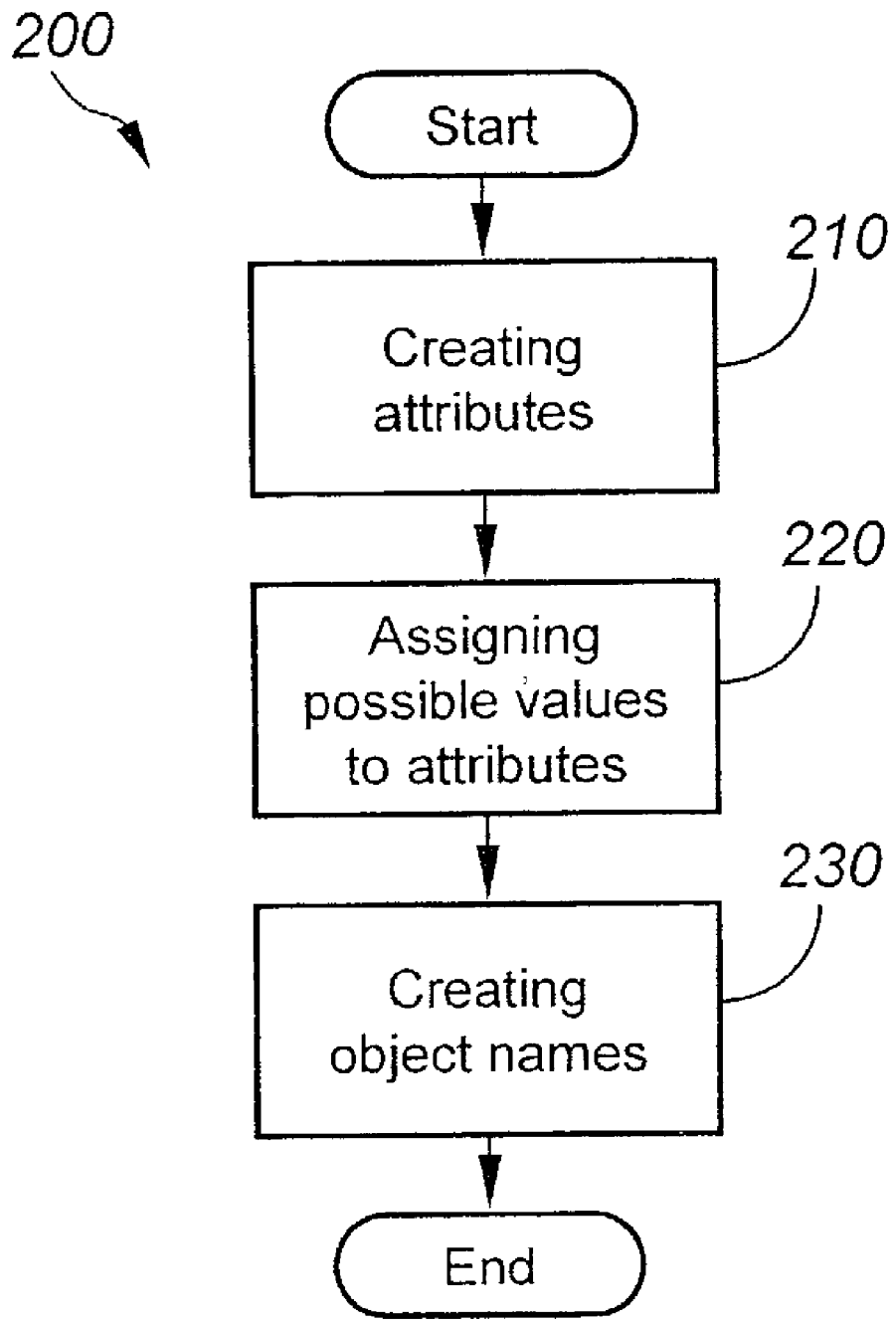
FIG. 2 is a flow chart illustrating a method of initial setup of a system utilizing an administrative tool.

FIG. 2 illustrates a method 200 of initial setup of system 100 utilizing administrative tool 180 to establish entries in rules about objects and users 150. The following examples focus upon the use of BMAP in rules about objects/users 150, but other database administration systems can also be used. Method 200 includes the following steps:

Step 210: Creating Attributes

In this step, an administrator using administrator PC 190 creates attributes for data 160. Administrator PC 190 transfers the list of created attributes to administrative tool 180. The following list of attributes, for example, may characterize a hypothetical sales management system:

Region
Relationship
Special Handling
Read
Write

Step 220: Assigning Possible Values to Attributes

In this step, an administrator using administrator PC 190 connected to administrative tool 180 assigns possible values to attributes, where relevant. Examples of values include full descriptions, "present" or non-applicable ("N/A"), and values may be multiple choices, such as the following:

| | |
|---|---|
| Region | North, East, South, West, Global |
| Relationship | Client, Prospect, Vendor |
| Special Handling | N/A |
| Read | N/A |
| Write | N/A |

Step 230: Creating Object Names

In this step, an administrator using administrator PC 190 connected to administrative tool 180 creates object names using these attributes and values along with an object name. These attributes and values would be optionally associated with each object key as it is created (either by a program or by an administrator). The following is a continued example:

| Object Key | Attributes & Values |
|---|---|
| ReadContract 703 | Region = East, Relationship = Client, Read |
| WriteContract 703 | Region = East, Relationship = Client, Write |
| ReadVendorRelationsDoc | Relationship = Vendor |

The attribute and value information could be tracked in a separate table, or it could be made part of the object key itself, such as:

Combined object key ReadContract 703 $ Buyer:East; Relationship:Client; Read In the case of the above example, "$" is used to separate the object key name from attributes and values, ";" is used to separate attributes, and ":" is used to separate associated values, if any. Alternatively, the administrator can use other coding protocols, such as concatenating an XML string as follows:

ReadContract703<Buyer="East"&Relationship="Client" Read>

Figure 3:
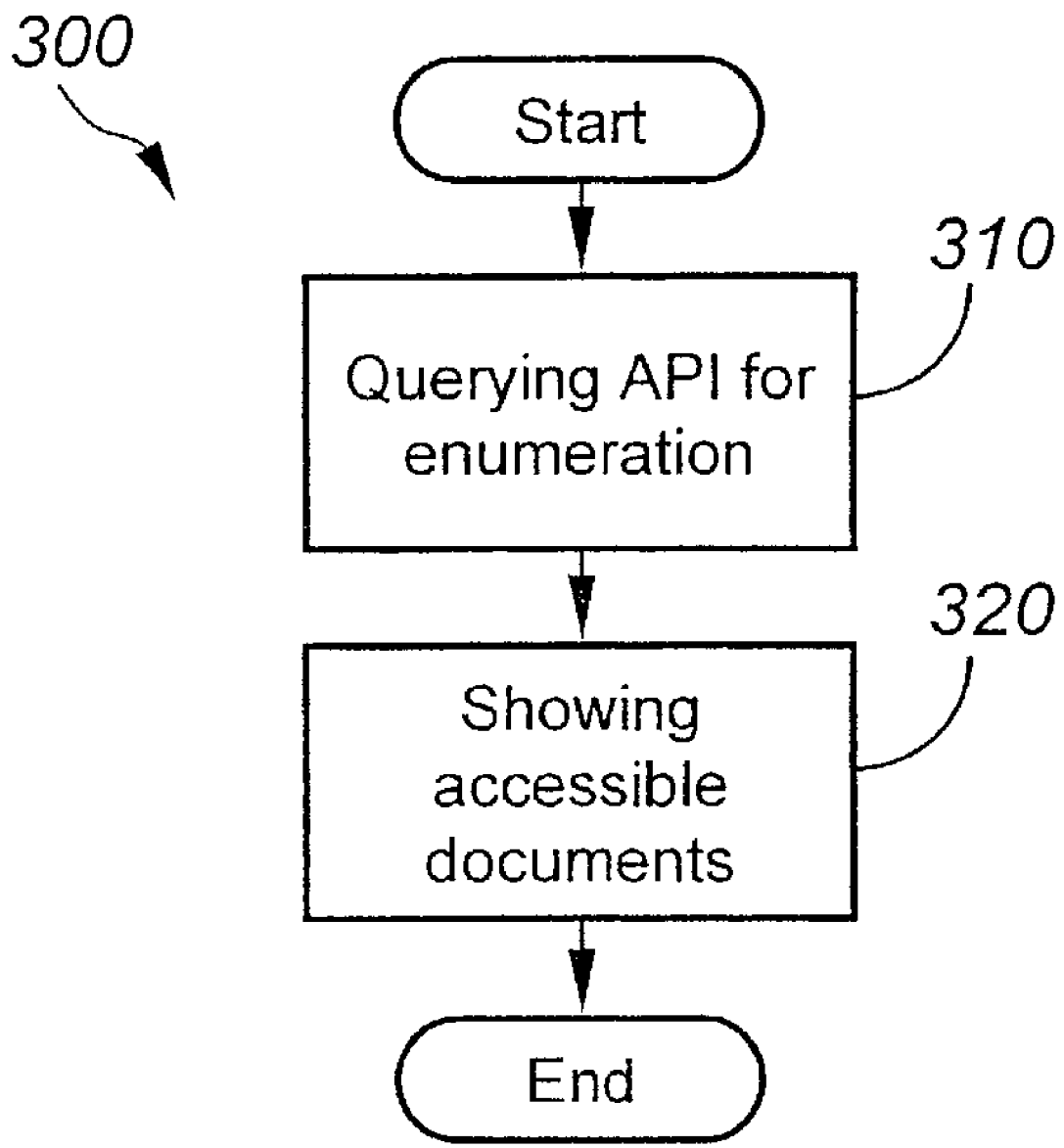
FIG. 3 is a flow chart illustrating a method of using system to order enumerated accessible resources.

FIG. 3 illustrates a method 300 of using system 100 to order enumerated accessible resources. Method 300 includes the following steps:

Step 310: Querying API for Enumeration

In this step, client PC 110 using application program 120 queries an associated API on administration tool 180. Programs could query through an API (if they have sufficient authorization) for an enumeration of all keys meeting certain criteria about the originating template as well as attributes and values in ways logically equivalent to a query, such as:

Relationship=Client AND ANY Region AND NOT SpecialHandling

Step 320: Showing Accessible Documents

In this step, query results present client PC 110 with the listing of accessible documents. Further, this listing may be ordered, e.g., to show a user the documents with high preference ratings as adjudicated for that particular user.

Figure 4:
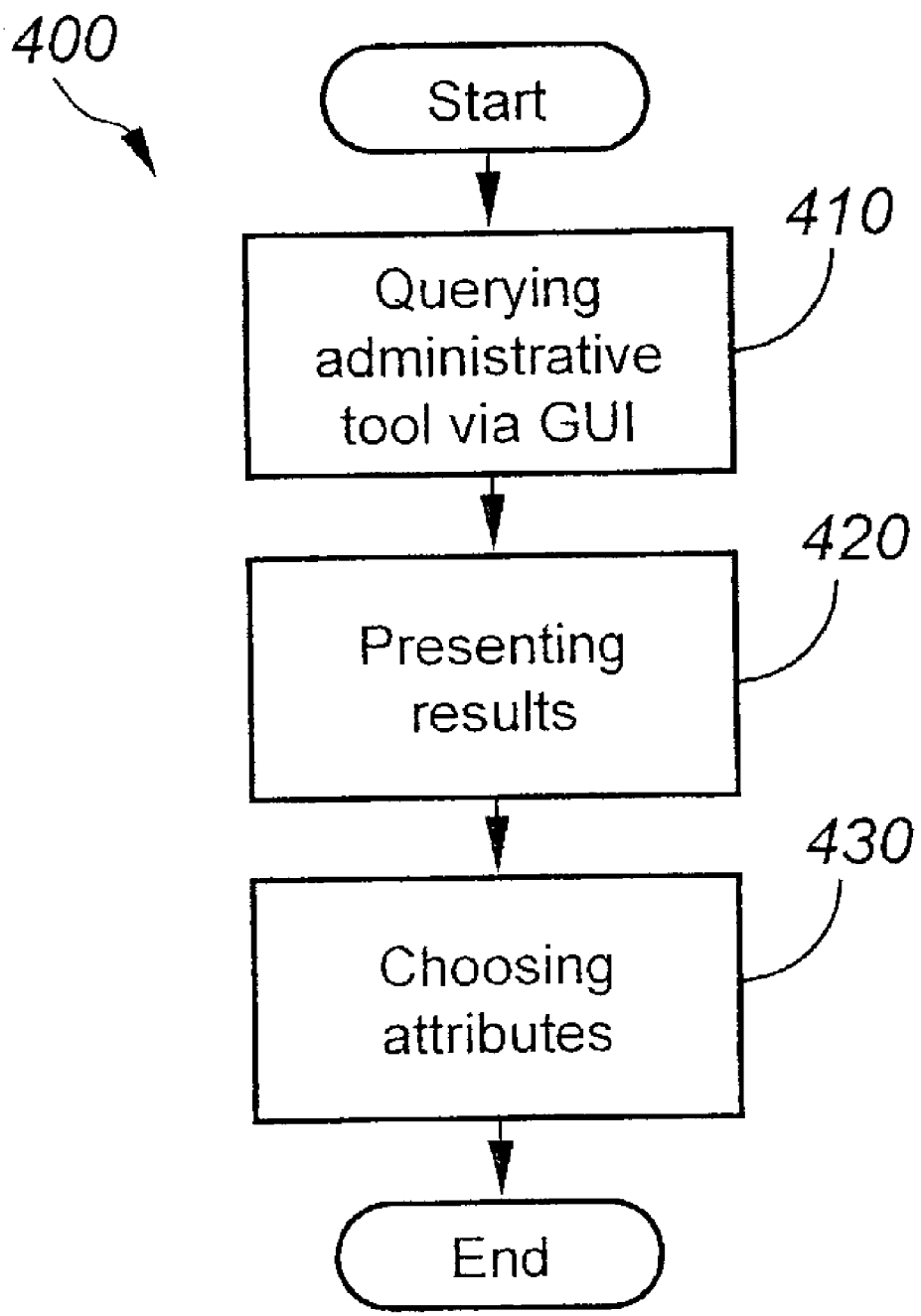
FIG. 4 is a flow chart illustrating a method of using attributes and values to ease access control administration.

FIG. 4 illustrates a method 400 of using attributes and values to ease access control administration. (Selection based on originating template can also be included, as described further on.) Method 400 includes the following steps:

Step 410: Querying Administrative Tool via GUI Form

In this step, administrator PC 190 queries administrative tool 180 using a graphical user interface (GUI) programmed specifically for that purpose. Administrator PC 190 could also describe subsets by checking off possibilities in a table, using the following GUI:

| SELECTION: | Region: | _NoneXAny_North_East_South _West _Global |
| --- | --- | --- |
| | Relationship: | _None _AnyXClientXProspect_Vendor |
| | Special Handling: | _Must be Present_Cannot be Present |
| | Read: | _Must be Present_Cannot be Present |
| | Write: | XMust be Present_Cannot be Present |
| ORDER BY: | Region: | 2 |
| | Relationship: | — |
| | SpecialHandling: | 1 |
| | Read: | — |
| | Write: | — |

Step 420: Presenting Results

In this step, administrative tool 180 presents results to administrator PC 190 in the form of an answer to the query in step 410. This generates a list of applicable object keys in the specified order, which could then be further administered, i.e., made available or denied to accessors or accessor groups, individually, by selection, or en masse.

Step 430: Choosing Attributes

In this step, administrator PC 190 chooses from the listed attributes.

Figure 5:
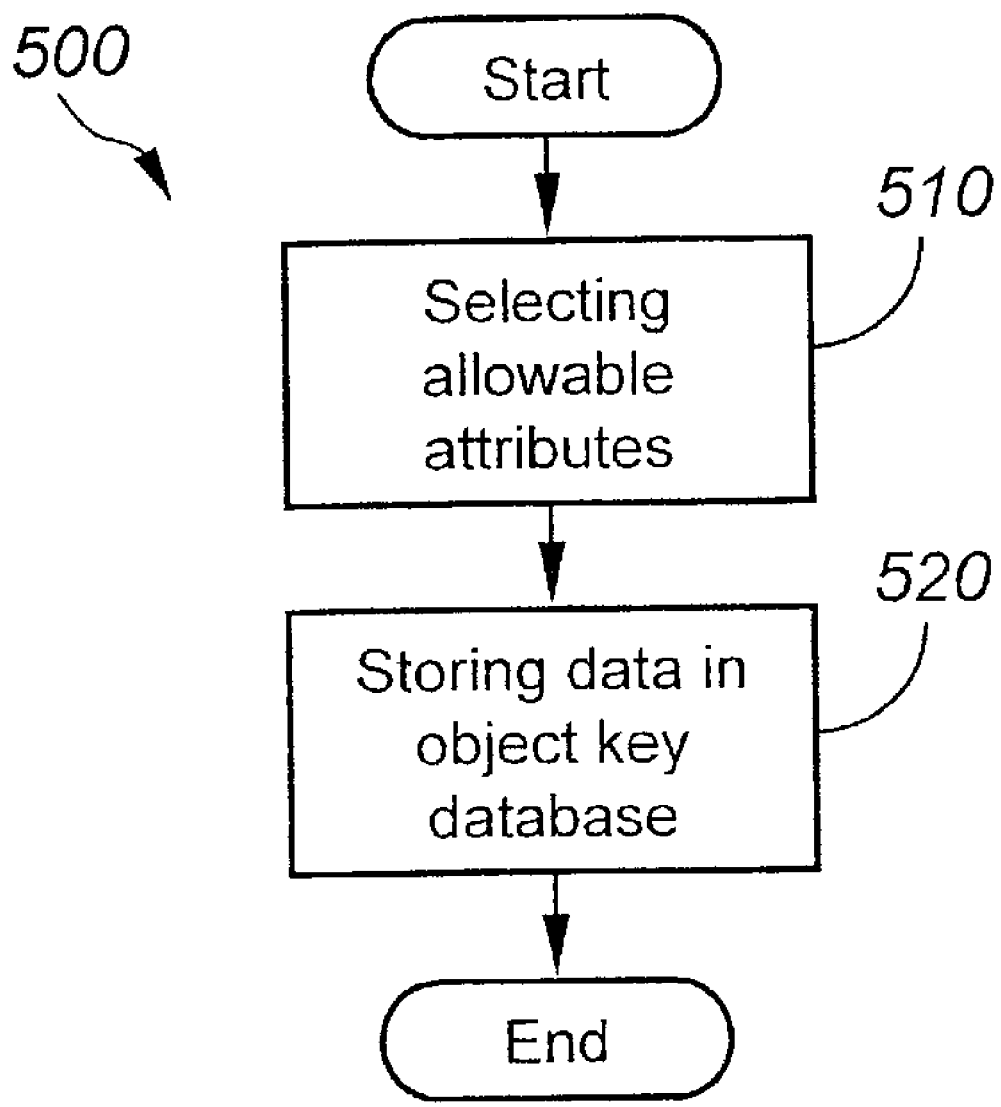
FIG. 5 is a flow chart illustrating a method of using attributes and values to segment administration.

FIG. 5 illustrates a method 500 of using attributes and values to segment administration by establishing "sub-administrators" to create and administer only certain types of object keys. Method 500 includes the following steps:

Step 510: Selecting Allowable Attributes

In this step, a "master administrator" (characterized by no access restrictions) selects allowable attributes for a sub-administrator. The master administrator uses a selection mechanism like that in "SELECTION" shown in step 410 to govern which object keys a particular sub-administrator can access.

Step 520: Storing Data in Object Key Database

In this step, administrative tool 180 stores data in an object key database. If desired, separate table criteria can determine which object keys can be created and which can be deleted. Typically, however, a separate database for storage of these object keys is not needed. Keys of this nature are coded in a special way so that only the master administrator can create, modify, and delete them. Using this technique, an Eastern administrator could be set up, for example, as the follow XML code:

¢JDoe<Region="East"Relationship="Prospect"Relationship="Vendor">

Figure 6:
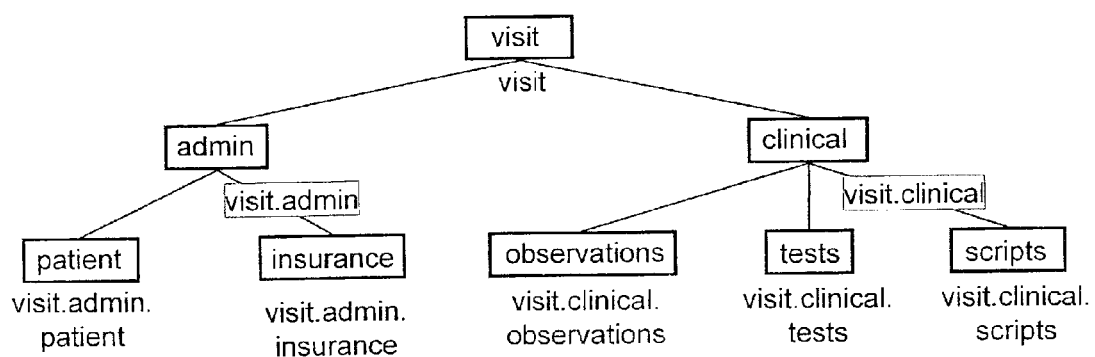
FIG. 6 is a block diagram showing an example of template information contained in a healthcare application.

FIG. 6 illustrates an example of template information contained in a healthcare application. Access templates (hereafter "templates") allow for easy creation and management of access policies to large numbers of resources. This can significantly reduce the complexity of granular high-volume authorization to records and content. Templates function apart from attributes and values, since they are two independent schemes that can be used both separately and together. Templates associate information or other resources related in some fashion. FIG. 6 provides representative information resources related to a doctor's visit. This example uses "dot" names, but the names could use any arbitrary standard. This template in an outline-style form would look like the following:

| | | | Resource | Access Privileges |
| --- | --- | --- | --- | --- |
| visit | | | visit | |
| | admin | | visit.admin | |
| | | patient | visit.admin.patient | |
| | | insurance | visit.admin.patient.insurance | |
| | clinical | | visit.clinical | |
| | | observations | visit.clinical.observations | |
| | | tests | visit.clinical.tests | |
| | | scripts | visit.clinical.scripts | |

The Access Privileges column (currently empty) contains any data expression meaningful for use in adjudicating whether or not a particular user or group has access to the associated data.

Note that there are separate entries for "visit", "visit.admin" and "visit.admin.patient" That is because it is possible to assign rights for entire subsections of the tree as well as for individual leaves (end nodes). This will be discussed further below in the section about the special parameter "{super}".

Typically, different users are permitted "read" access to information than "write" access. For instance, a doctor may be able to edit some of this information, but the patient may only be allowed to read it.

Figure 7:
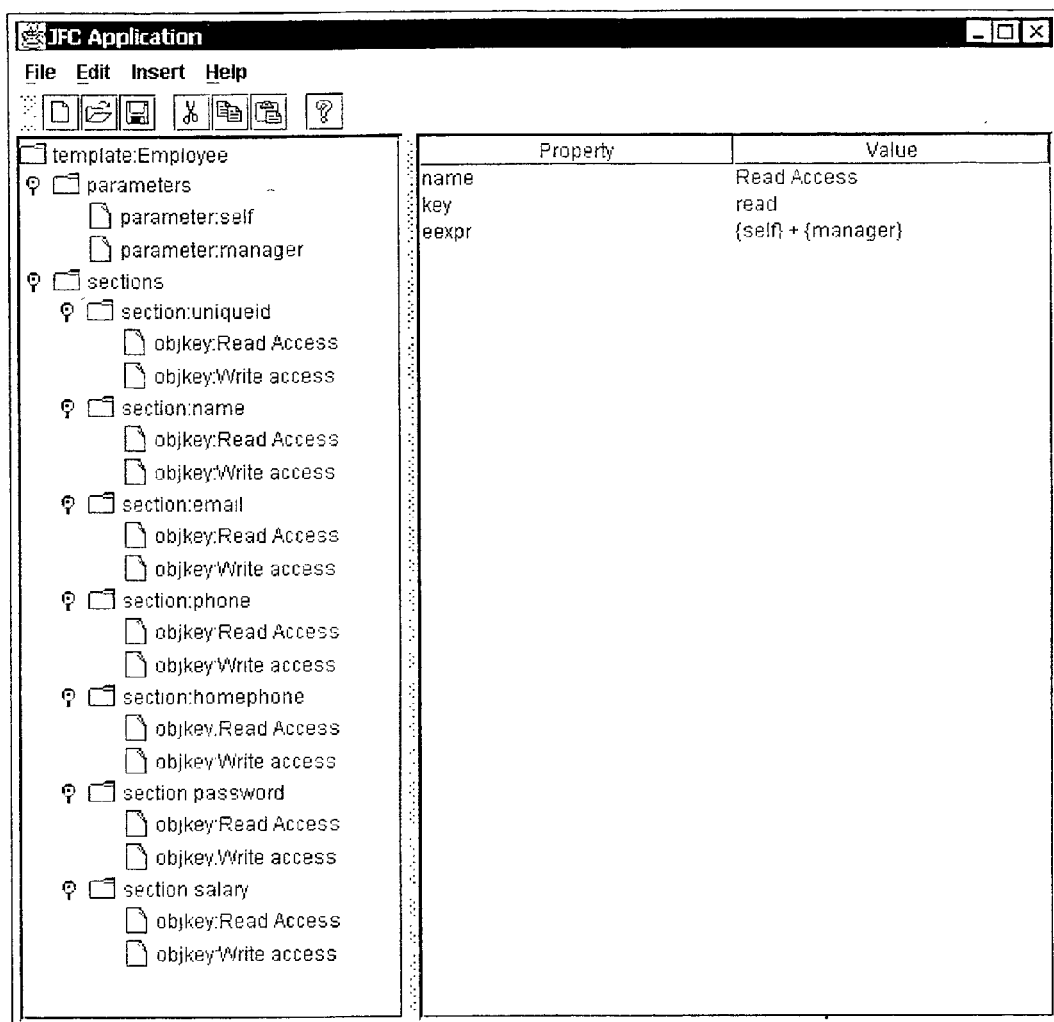
FIG. 7 is a screen shot of an example of a template GUI utilized in an employee information application.
Figure 8:
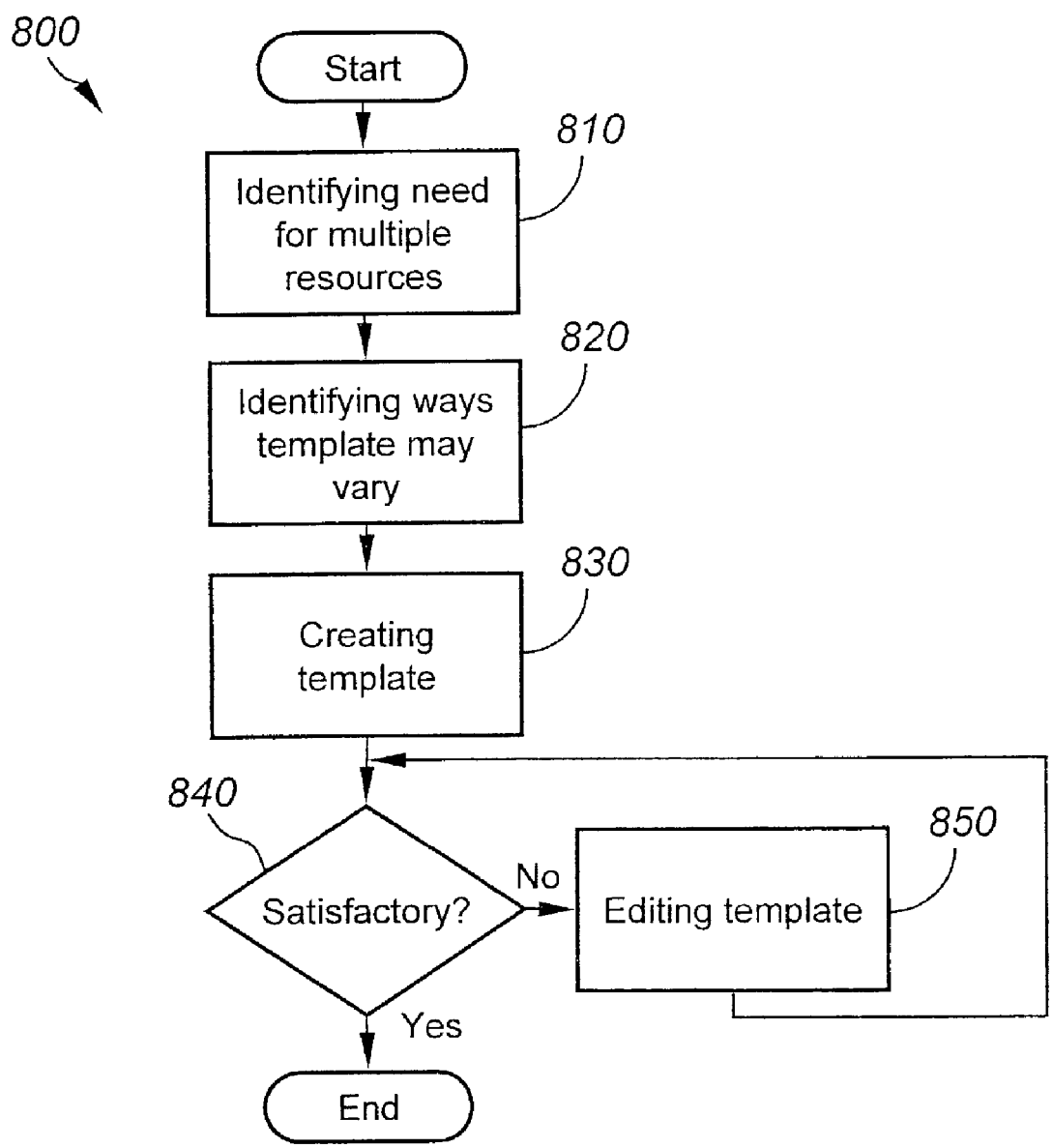
FIG. 8 is a flow chart illustrating a method of designing and creating a template.

FIG. 7 illustrates an example screenshot of a template GUI used in an employee information application. This example indicates separate read and write access rights for certain information resources. The panel on the right shows the values for the highlighted information, in this case: "Employees.salary.objkey.Read Access". In the right hand panel, "name" refers to the resource name, "key" represents an alternate description for the resource, and "eexpr" stands for "entitlement expression," representing the BMAP version of the "Access Privileges" field in the previous example. This example introduces the concept of parameters, which distinguish one instance (or "instantiation") of a template from another. Therefore, any template that can be used more than once requires at least one parameter. In this case, there are two parameters: {self}, which refers to the employee who is the subject of the record instance, and {manager}, which refers to his or her manager or managers (allowed to be a series of individuals, a group, or an expression containing both). Here, it indicates that either the employee him- or herself, or his or her manager or managers can read the "salary" section. An administrator can modify this expression at any time, either for this employee record alone, or for an arbitrarily large group. FIG. 8 describes the method of using a GUI such as this for creating and designing a template.

In addition, the system may implement an additional, very special, parameter which will be referred to as "super" and notated as "{super}". Wherever {super} is used in an Access Privileges expression, the Access Privileges expression of the next superior node is substituted. For instance, if the Access Privileges expression for a node is simply "{super}", then it has the same Access Privileges as its parent node.

If "{super}" is used for an Access Privileges expression for a node that has no parent, then a Default System Access Privileges expression determined by the System Administrator is used instead. Typically, the default Access Privileges expression for any node would be "{super}". With this arrangement, consequently, if no special Access Privileges were defined, all resource Access Privileges would default to this Default Access Privileges expression. This feature, along with the use of "{super}" makes it possible to control access very narrowly in some parts of the system and very broadly in others.

This use of {super} and Default System Access Privileges result in hierarchical inheritance of access privileges, thus making it possible for the administrator to maintain detailed granular of some parts of the system, while being able to manage other parts more broadly, increasing clarity and ease of administration.

FIG. 8 illustrates a method 800 of designing and creating a template. Method 800 includes the following steps:

Step 810: Identifying Need for Multiple Resources

In this step, an administrator using administrator PC 190 identifies a need for multiple resources related in a particular way.

Step 820: Identifying Ways Template May Vary

In this step, an administrator using administrator PC 190 identifies parameterized ways in which new template might vary, and stores these parameterized variances in administrative tool 180 using a GUI similar to that seen in FIG. 7.

Step 830: Creating Template

In this step, an administrator using administrator PC 190 creates a template showing these relationships, parameterized variations, and initial access control rules, names the template, and saves it in administrative tool 180 using a GUI similar to that seen in FIG. 7. At this point, the administrator has not created any resources. The template is a plan for creating resources, not the creation of resources itself.

Step 840: Satisfactory?

In this decision step, an administrator using administrator PC 190 determines whether the new template is satisfactory. If yes, method 800 ends; if no, method 800 proceeds to step 850.

Step 850: Editing Template

In this step, an administrator using administrator PC 190 edits the template, as necessary. System 100 may optionally keep track of when editing changes were made, since this information can be used to historically reconstruct how a template looked at a particular point in time. When the necessary edits are completed, method 800 returns to step 840. (Note that changes made to the policies inside a template can be applied to new resources created by the template as well as already instantiated resources, i.e. changes access privileges for existing resources created by templates can be done very easily using the template itself.)

Figure 9:
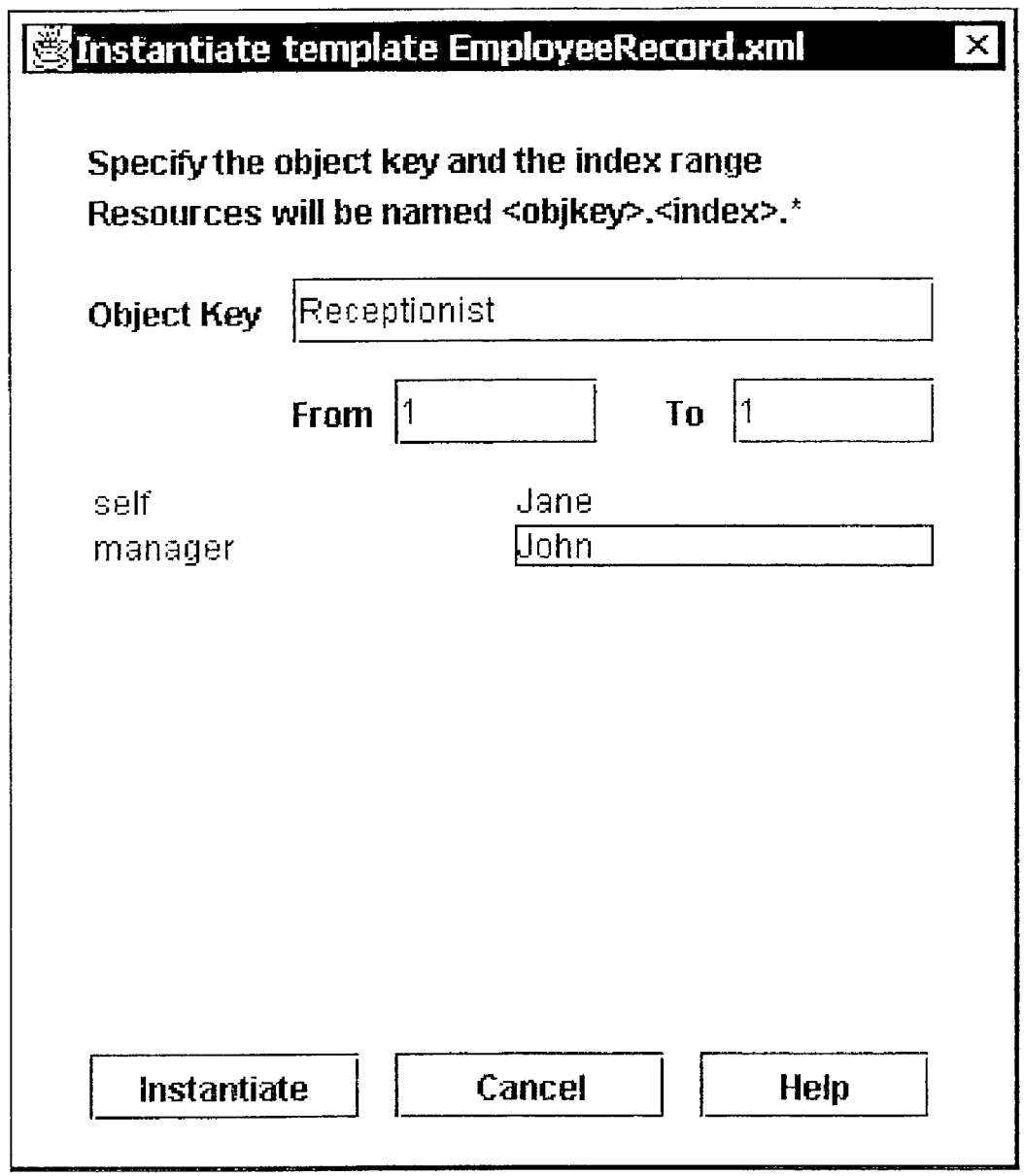
FIG. 9 is a screen shot of an example of GUI for template instantiation.

FIG. 9 illustrates a screenshot example of a GUI used for template instantiation. Instantiation refers to using the template as a plan to create resources. Either a computer application program or a system administrator using administrator PC 190 can initiate instantiations. Because administrative tool 180 stores the time of resources creation, retrieval and reconstruction of which resources were created from each instantiation of the template is possible. This information is important if the administrator needs to edit control of resources en masse or to delete the instantiation of the template at some point in time. Further, an administrator can extend the use of efficient selection of resource subsets by attributes and values as described in method 400 to include the originating template and time of creation as additional criteria. For instance, one could quickly retrieve (from a large set of resources), such things as all of the resources that were created from a particular template, values within a particular time range, and instantiations that have a particular value of an attribute. One could then make the same editing change to the Access Privileges for all the selected resources. This functionality gives the administrator, or an administrating access control program, efficient access to narrowly defined sets of available resources.

Figure 10:
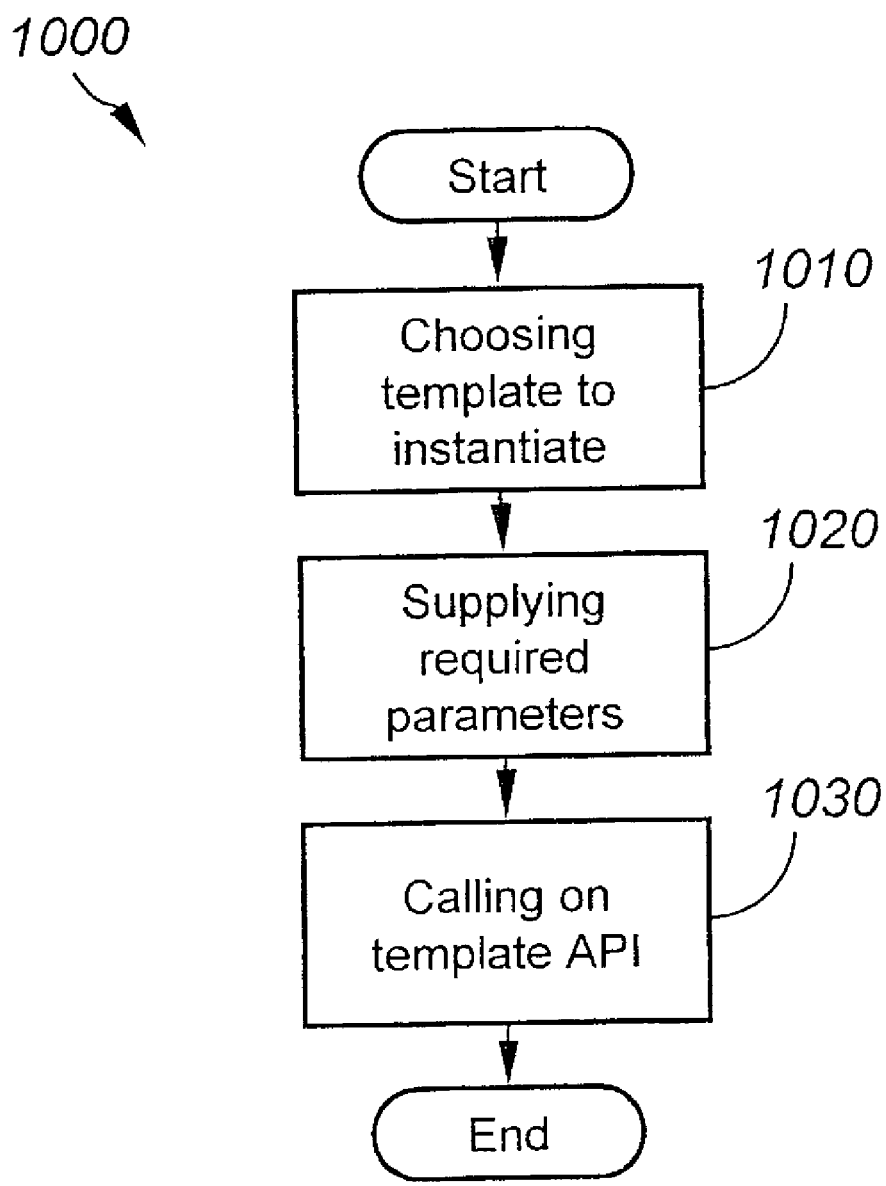
FIG. 10 is a flow chart illustrating a method of instantiating a template.

Alternatively, an administrator can segment administrative access by template, providing another method for delegating subsets of administrative powers and giving additional people limited control over subsets of the resources. FIG. 10 describes the method of using such a GUI for template instantiation.

FIG. 10 illustrates a method 1000 of instantiating a template. Method 1000 includes the following steps:

Step 1010: Choosing Template to Instantiate

In this step, an administrator using administrator PC 190 chooses a template to instantiate from the already created templates, such as those created using method 800.

Step 1020: Supplying Required Parameters

In this step, an administrator using administrator PC 190 supplies the values of required parameters, as determined by the application. In the example provided in FIG. 9, the administrator might give {self} the value MichaelJones and might give {manager} the value KevinCleary. The resulting "eexpr" for the template resource displayed in this instantiation would then be MichaelJones+KevinCleary, so that the actual values of the parameters are substituted for the names of the parameters. Each instantiation requires the use of different values.

Step 1030: Calling on Template API

In this step, an administrator using administrator PC 190 calls on the template API to create the related resources as requested by the choice of template and parameters. Processing of method 1000 then ends.

Other embodiments of the invention will be apparent to those skilled in the art from a consideration of the specification or practice of the invention disclosed herein. It is intended that the specification and examples be considered as exemplary only.

What is claimed is:

1. A computer implemented system for administration of access control to numerous resources and objects, comprising:
   a data store for storing objects;
   a controller for storing and operating resources;
   a client computer for executing an application program for requesting authorization to the resources and objects;
   a store of rules about requestors and resources and/or objects for determining whether requested authorizations should be allowed, wherein accessibility to one of a plurality of resources is determined in accordance with a hierarchical representation of said plurality of said resources, said hierarchical representation including at least one parent resource with a first accessibility level and an associated child resource with an accessibility level inherited from said at least one parent resource when a special parameter for said accessibility level is specified for said child resources, each accessibility level being used in adjudicating whether a user or group has access to data associated with a resource;

an authorization mechanism in communication with the application program and store of rules for receiving authorization requests from the client computer, consulting the store of rules for determinations whether the requested authorization should be allowed, accessing the data store and/or controller as requested in an authorized request for resources and/or objects, and returning a result from the access to the client computer; and an administrative tool for creating and manipulating the rules about requestors and resources and/or objects, the administrative tool having an application programming interface.

2. The system of claim 1, wherein the application program resides on the client computer.

3. The system of claim 1, wherein the application program is remotely connected to the client computer via a network.

4. The system of claim 1, wherein the authorization mechanism is comprised of an Entitlement Engine.

5. The system of claim 1, wherein the client computer and authorization mechanism are connected via a network.

6. The system of claim 5, wherein the network comprises the Internet.

7. The system of claim 5, wherein the network comprises an intranet.

8. The system of claim 1, further comprising:
an administrative computer connected via a network to the administrative tool for managing the administrative tool.

9. The system of claim 1, wherein the authorization requests comprise the identity of a requestor and a description of the resource or object requested.

10. The system of claim 1, wherein the rules take the form of a data table employing BMAP or another database administration system protocol used to store and adjudicate access control decisions.

11. The system of claim 8, comprising code that uses the administrative computer for,
creating attributes for data objects;
transferring the attributes to the administrative tool;
assigning possible values to the attributes; and
creating object key names using the attributes and possible values.

12. The system of claim 11, further comprising code for:
associating the attributes and values with each object key name as it is created.

13. The system of claim 1 further comprising code for ordering enumerated accessible resources, including code for:
via the client computer querying the API on the administrative tool for an enumeration of all keys meeting certain criteria relating to an originating template and attributes and values logically equivalent to the query;
returning an enumerated list of results from the administrative tool to the client computer.

14. The system of claim 8 comprising code for easing access control administration, including code that uses the administrative computer for
querying the administrative tool for an enumeration of all keys meeting certain criteria relating to an originating template and attributes and values logically equivalent to the query;
receiving a resulting list from the administrative tool;
choosing attributes for editing from the list as desired.

15. The system of claim 14, wherein the code that uses the administrative system for said querying uses a graphical user interface (GUI) form.

16. The system of claim 1 further comprising code for segmenting administration of access control, including code for:
selecting allowable attributes that a sub-administrator is authorized to access and maintain;
storing the allowed attributes the sub-administrator is authorized to access and maintain in an object key database, wherein the object key can be manipulated only by a master administrator.

17. The system of claim 8 further comprising code for designing and creating templates in access control administration, including code for:
identifying a need for multiple resources to be associated in a template;
identifying parameterized variations in the template; and
via the administrative computer,
storing the variations in the administrative tool,
creating the template including illustration of the association between resources, parameterized variations, initial access control rules and template name, and
editing the template as necessary.

18. The system of claim 8 further comprising code for instantiating a template including code that uses the administrative computer for
choosing a template to instantiate from already created templates;
supplying values of template parameters as required by the instantiation; and
calling on a template applications program interface to create related resources as requested by choice of template and parameters.

19. The system of claim 1, wherein, if accessibility of a child resource is specified to be that of its parent and said child resource has no parent, accessibility of said child resource is in accordance with a default access level.

20. The system of claim 17, wherein said template specifies said hierarchical representation, and said accessibility to one of said plurality of resources is determined in accordance with an instantiation of said template.

21. The system of claim 17, wherein the template is a pattern defining said hierarchical representation of a plurality of nodes used in producing a plurality of instantiations of said template and when a template is instantiated, each node corresponds to a resource of each particular instantiation produced in accordance with at least one parameter value.

22. The system of claim 18, wherein each parameter of a template represents a variation of access to resources in accordance with said template.

23. The system of claim 22, wherein a value is specified for each parameter in an instantiation of a template to create an instance of said template in accordance with said value.

* * * * *